May 11, 1965  S. N. ZILBERFARB  3,182,686

TRANSDUCER

Filed March 28, 1962

INVENTOR
SAUL N. ZILBERFARB

BY
*Griffin and Stokes*
ATTORNEYS

May 11, 1965   S. N. ZILBERFARB   3,182,686
TRANSDUCER
Filed March 28, 1962   2 Sheets-Sheet 2

United States Patent Office 3,182,686
Patented May 11, 1965

3,182,686
TRANSDUCER
Saul N. Zilberfarb, Philadelphia, Pa., assignor to Sperry Rand Corporation, New York, N.Y., a corporation of Delaware
Filed Mar. 28, 1962, Ser. No. 183,069
11 Claims. (Cl. 138—45)

This invention is primarily concerned with controlling the flow of fluid within a conduit such as the control channel of a pure fluid amplifier. Pure fluid amplifiers have recently gained prominence in the data processing field because of their ruggedness and adaptability for miniaturization, together with the ability to respond to intermediate pulse repetition rates up to 20 kc. The conduits utilized to transmit fluid within such an amplifier are quite small. Means must be provided in many of the fluid systems for varying the amount of fluid flowing through certain passageways. Furthermore, it is often necessary to make compatible those systems operating in different mediums, such as those representing information by pulses traveling through a fluid medium, and those utilizing electrical manifestations. This is especially required when one system is the processor, and the other is the peripheral unit for supplying information thereto. Therefore, the present invention essentially provides an electrically operated gate for fluid flow in conduits of small diameter.

Accordingly, one object of this invention is to provide a transducer for converting electrical energy into fluid energy.

Another object of the present invention is to provide electrically operated means for varying the control jet stream in a pure fluid amplifier.

Yet another object of the invention is to provide at least one piezo-electric crystal or the like, such as ferromagnetic material, mounted in a fluid conducting conduit, where a change can be effected in a mechanial dimension thereof to vary the fluid flow through said conduit.

A further object of the present invention is to provide a pair of co-planar piezo-electric crystals or the like mounted in a fluid conducting conduit which act together as a gate to interrupt the flow of fluid therein.

A further object of the present invention is to provide pairs of piezo-electric crystals or the like mounted at different axial positions of a fluid conducting conduit for regulating the flow of fluid therein.

Still another object of the present invention is to provide at least one piezo-electric crystal or the like acting as a gate in the control channel of a pure fluid amplifier.

These and other objects of the present invention will become apparent during the course of the following description, which is to be read in conjunction with the figures in which.

Figure 1:
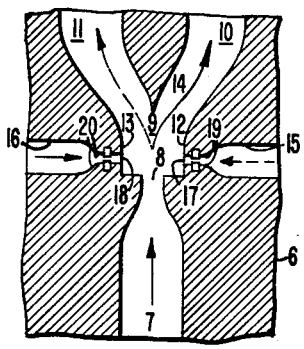
FIGURE 1 is a sectional simplified plan view of a typical pure fluid amplifier in which the present invention finds particular but no exclusive use.

FIGURE 1 is a sectional plan view of a typical pure fluid amplifier wherein the present invention finds particular use for varying the fluid jet streams emerging from the control passageways and orifices. Such a fluid amplifier normally comprises a solid body 6 having a plurality of fluid passageways through which the working fluid may flow. The working fluid may be either air or another gas, or water or another liquid. Although a sectional view of the amplifier is shown in FIGURE 1, it is to be understood that it is customary to mold or otherwise form a fluid passageway in one plastic laminate which is then covered on each side with solid plastic sheets so that the passageways are enclosed. A compressor or pump, not shown in FIGURE 1, supplies a suitably regulated stream of fluid to the power input passageway 7. The power stream then passes through a restricted orifice 8 and emerges into chamber 9 as a high velocity jet stream.

The chamber 9 is formed by the convergence of right output passageway 10 and left output passageway 11. The right wall 12 and left wall 13 of the chamber are set back from orifice 8 and, in accordance with Bernoulli's Principle, the high velocity jet issuing from the orifice creates regions of low pressure adjacent to these walls. Within these regions of low pressure are layers of fluid which move at a much slower speed than the jet stream, hence these regions are referred to as boundary layers. By properly designing chamber 9, these low pressure areas may be utilized to control the flow path of the jet issuing from orifice 8.

In the example shown, this is accomplished in part by asymmetrically placing the body 14 so that the opening from the chamber into passageway 10 is greater than the opening from the chamber into passageway 11. Under these conditions, and assuming that there are no control signal inputs, the jet stream issuing from orifice 8 will tend to enter passageway 10 because of the lower pressure. As the jet stream moves into this passageway, it creates an even lower pressure in the region adjacent wall 12 and thereby "locks on" to this wall. This condition may be thought of as a stable state wherein the power stream entering passageway 10 flows along a path indicated by the solid arrow. Therefore, a stable condition exists in the amplifier when the fluid stream is locked onto wall 12, with the consequent result that fluid exists only from the output of passageway 10.

Two control signal input passageways 15 and 16 are shown. Passage 15 exits into chamber 9 via orifice 17 positioned in wall 12. Passage 16 exits into chamber 9 via orifice 18 located in wall 13. Both chambers are selectively supplied with the same fluid medium as used in the fluid system. If sufficient input pressure is supplied to either of the passage 15 or 16, then a control jet stream exits from the respective orifice 17 or 18 in order to strike the power stream issuing from orifice 8.

The operation of a fluid amplifier such as shown in FIGURE 1 is as follows. Assume that the input power jet stream issuing from orifice 8 is locked onto wall 12 and passes through passageway 10 to one output of the amplifier. If a control stream of the same fluid issues from orifice 17 having sufficient energy, the boundary layer is broken and dispersed along wall 12 to create a condition of instability which tends to push the power stream into a direction away from wall 12. As the power stream is thus pushed to the left, it withdraws more and more molecules of fluid from the region adjacent wall 13, thus creating a low pressure region. The power stream thereupon moves into this low pressure region and locks onto wall 13, with the result being that the power stream now passes through passageway 11 to the other output of the amplifier. Alternatively, another mode of operation of the fluid amplifier is the presence of an energy transfer between the control stream and the power jet stream, such that the collision of these two streams forces the power stream to the left where it is maintained in passageway 11 for the duration of the control stream from orifice 17. For either mode of operation, the two outputs from the fluid amplifier may be connected in circuit with other fluid devices which do not comprise part of the present invention.

Figure 2:
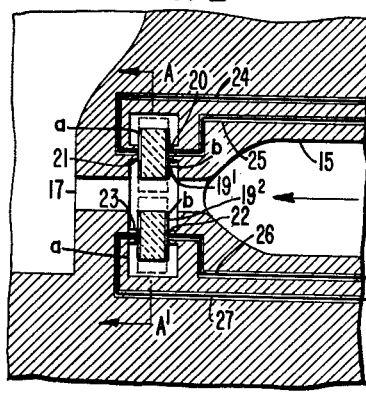
FIGURE 2 is a detailed sectional plan view of one control channel of the amplifier shown in FIGURE 1.

The present invention is concerned with controlling the flow of the fluid streams exiting from orifices 17 and 18 of control channels 15 and 16 in FIGURE 1. In general, the invention comprises one or more piezo-electric crystals or the like, such as ferromagnetic material, which are mounted in the control channels in such a fashion that a change in their mechanical dimension effectively varies the cross-sectional area of the control channel and thus varies the control stream emitted to chamber 9. In FIGURE 1, a pair of piezo-electric crystals is shown mounted in each of the control channels 15 and 16, said crystals being represented respectively by the blocks 19 and 20. FIGURE 2 is a detailed sectional plan view of only control channel 15 which includes a nozzle exiting via orifice 17 into chamber 9, and more fully shows the mounting of the piezo-electric crystals. For example, a pair of piezo-electric crystals $19^1$ and $19^2$ are mounted within diametrically opposed recessed portions of the channel wall. Each crystal is rigidly clamped within its recess by means of studs 20, 21 or 22, 23 which contact the crystal at its nodal point. The crystal is mounted so that one mechanical axis thereof is transverse to the longitudinal axis of fluid flow through the channel nozzle.

In order to change the physical dimension of the crystal along its mechanical axis, potential must be applied across two of its faces which are perpendicular to one of its electrical axis. This is performed in FIGURE 2 by plating electrodes on two opposite faces $a$ and $b$ of the crystal by techniques well known in the art. The studs 20 and 21, associated with crystal $19^1$, are hollow to allow electrical conductors placed in channels 24 and 25 to be connected to respective ones of the plated electrodes. Crystal $19^2$ is also provided with plated electrodes, and studs 22 and 23 are hollowed to permit electrical conductors to be connected thereto. The conductors in channels 24 and 27 are externally connected together, while the conductors in channels 25 and 26 are likewise connected together and to reference ground. A source of potential, such as battery 28, may be selectively switched into and out of circuit, so that when the switch is closed a difference of potential is applied across the indicated faces $a$ and $b$ of each crystal.

Figure 3:
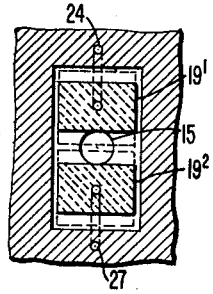
FIGURE 3 is a sectional elevation view of the control channel of FIGURE 2.

FIGURE 3 is the section A—A' of FIGURE 2 showing an end elevation view of the nozzle as well as illustrating the respective positions of the two crystals $19^1$ and $19^2$. As seen in FIGURE 3, each of these crystals is approximately rectangular in shape and is mounted on one side of the fluid passageway.

Figure 4:
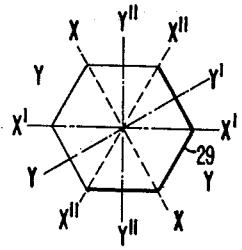
FIGURE 4 is a plan view of a typical piezo-electric quartz crystal.
Figure 5:
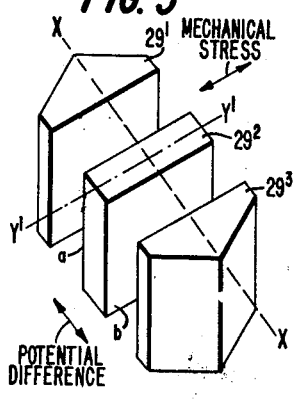
FIGURE 5 illustrates how a section may be cut from the crystal of FIGURE 4 for use in the present invention.

To better understand the operation of the present invention, a brief description will now be given of the piezo-electric phenomenon with particular reference to FIGURES 4 and 5. In general, the piezo-electric effect is that characteristic exhibited by certain crystals whereby a mechanical stress produces an electric charge and conversely, an electric charge produces a mechanical stress. This piezo-electric effect is exhibited in different degrees by the crystals of various substances such as quartz, tourmaline, and Rochelle salt, and the newer ceramics such as Barium Titanate, etc. FIGURE 4 shows the plan view of a hexagonal cross-section which is cut perpendicular to the optical axis of a natural quartz crystal. The three axes passing through the corners of the hexagon are called electrical or X axes, while the three axes perpendicular to the faces of the hexagon are known as mechanical or Y axes. FIGURE 5 is a perspective view of the section in FIGURE 4 and illustrates its thickness as well as its hexagonal cross-section. If a flat section is cut from this crystal in such away as to have its flat sides $a$ and $b$ perpendicular to an X axis, it is called an X cut crystal. The center section $29^2$ of the configuration in FIGURE 5 is such an X cut crystal, since its two parallel vertical faces $a$ and $b$ are perpendicular to one of the X axes passing through the corners of the hexagon. This center crystal cut of FIGURE 5 exhibits the piezo-electric effect. Thus, if an electric potential difference is applied across its two faces, $a$ and $b$, a mechanical stress is produced along the Y' axis and a change in dimension will occur in this direction. Depending upon the polarity of this applied potential, the change in mechanical dimension of the crystal cut along its Y' axis will either be an elongation or a compression.

Referring again to FIGURE 2, if crystal $19^1$ is an X cut crystal like section $29^2$ in FIGURE 5, then its mechanical Y axis is considered to be vertical in FIGURE 2 while its electrical X axis is horizontal and runs between the two supporting studs 20 and 21. A potential difference applied parallel to the X axis (by means of battery 28, the conductors, and the crystal electrodes on the two vertical faces $a$ and $b$) causes a mechanical stress in the vertical direction so that the crystal exhibits a change in dimension. If, in the absence of a potential across its electrodes the crystal has a vertical dimension as shown by the solid lines in FIGURE 2, then the potential of battery 28 should be such that upon closing the switch the crystal extends into the channel nozzle as shown by the dotted lines. Since crystal $19^1$ is clamped at its nodal points, a longitudinal extension will also occur upwards into its recess. In like fashion, crystal $19^2$ also extends into the channel upon application of a potential across its electrodes, so that the effective cross-sectional area of the nozzle is reduced. The degree of reduction can be such to substantially affect the fluid flowing therethrough so as to reduce or entirely erase the effect the control stream has upon the power stream in chamber 9. Upon opening the battery switch, termination of the potential difference across the crystal faces will allow each crystal to return to its normal solid line dimension.

It may therefore be appreciated from the above that the present invention provides means to control the fluid flowing in a control channel of a typical fluid amplifier. Another way of expressing its function is to consider that the device acts as a transducer for converting electric energy into fluid energy. For this reason, the present invention may be utilized in the environment other than the fluid amplifier art, which is but an example of a particularly successful application of the device.

It must also be mentioned that a change in the mode of operation of FIGURE 2 may be effected quite simply. For example, crystal $19^1$ and $19^2$ might normally, in the absence of an applied potential, substantially extend into the control channel so as to materially impede or prevent progress of the control stream. In this case, the potential of battery 28 should be such that when the switch is closed, the resulting mechanical stress along the Y axis of the crystal causes each crystal to retract into its recess, thus increasing the cross-sectional area of the nozzle. Furthermore, battery 28 shown in FIGURE 2 might be replaced by a source of alternating potential such that modulation of the control fluid stream can occur due to the corresponding oscillatory motion of the crystals.

Figure 6:
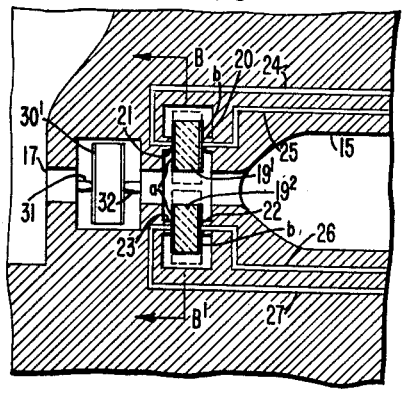
FIGURE 6 illustrates an alternative embodiment of the present invention which uses two pairs of crystals.
Figure 7:
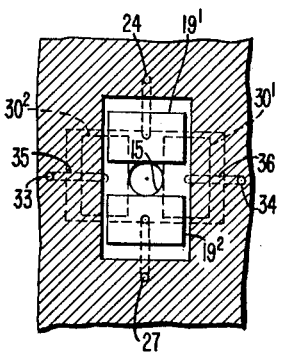
FIGURE 7 is a sectional elevation view of FIGURE 6.

FIGURES 6 and 7 show an alternative embodiment of the present invention wherein two pairs of piezo-electric crystals are provided to control the fluid flowing through the control nozzle. Elements in these figures, which correspond in structure and function to elements in FIGURES 1-3, have similar identifying numbers. A first pair of crystals 19$^1$ and 19$^2$ are shown mounted in respective recesses which are interposed radially on opposite sides of the channel at a particular point along the axis of flow. Each of these crystals is plated with electrodes across which a potential is applied via electrical conductors placed in channels 24 through 27. In addition to this pair of crystals, a second pair of crystals 30$^1$ and 30$^2$ is mounted at a different axial position of the control nozzle such that their mechanical axes are effectively at right angles with the mechanical axes of the first pair of crystals 19$^1$ and 19$^2$. Studs 31 and 32 are used to clamp crystal 30$^1$ at its nodal point, while a second pair of studs (not shown) similarly clamp crystal 30$^2$. This configuration is more clearly shown in FIGURE 7, where it is noted that the second pair of crystals 30$^1$ and 30$^2$ also have provided channels 33 through 36 for holding electrical conductors which are connected to their electrodes in the same manner as provided for the first pair of crystals. When both pairs of crystals are activated simultaneously, the orifice area of the channel nozzle changes exponentially, as opposed to the linear change occurring in the embodiment of FIGURE 2.

Figure 8:
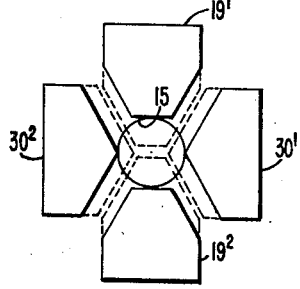
FIGURE 8 illustrates a third embodiment of the present invention which uses two pairs of crystals all disposed in the same plane.

In FIGURE 6, the two pairs of crystals are disposed in parallel planes one behind the other, with their mechanical axes of displacement at right angles. FIGURE 8 is a diagrammatic view of an alternative arrangement of two pairs of crystals, with both pairs being disposed in the same plane. The shape of crystals 19$^1$ and 19$^2$ is no longer rectangular, but is such to allow a complementary fit with crystals 30$^1$ and 30$^2$ of the other pair. For example, crystals 30$^1$ and 30$^2$ have their ends nearest crystals 19$^1$ and 19$^2$ in the shape of a triangle, while the latter have their ends in the shape of a trapezoid. Thus, when both pairs of crystals are simultaneously actuated, each extends to a position indicated by the dotted lines to reduce the orifice area and thus diminish the control stream. Conversely, the dotted lines in FIGURE 8 may be taken as the position of unenergized crystals such that upon application of the proper potential across the face of each, each retracts to a position indicated by the solid lines.

Although the above description of FIGURES 1 through 8 has referred only to the so-called X-cut crystal, it is to be understood that other crystal cuts may be utilized so long as the crystal is mounted with at least one mechanical axis or component thereof being transverse to the axis of fluid flow within the conduit in order that a change in dimension of the crystal along this axis will vary the effective size of the conduit cross-sectional area. Furthermore, different means for mounting a crystal adjacent to the fluid conduit may obviously be used other than those specifically shown in the figures which are merely exemplary. It is also to be understood that some environments may need only a single crystal if the conduit is quite small or if it is not necessary to substantially completely block the conduit.

Figure 9:
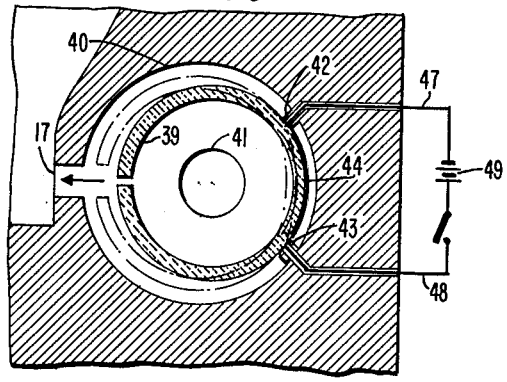
FIGURES 9 through 13 show another embodiment of the present invention wherein a piezo-electric crystal operates in a flexural mode.
Figure 10:
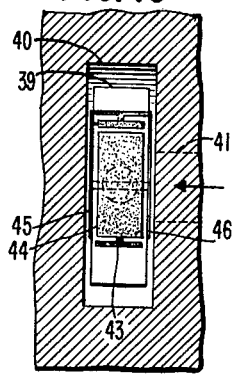
Figure 11:
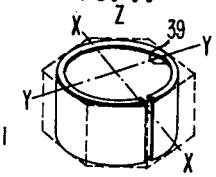

FIGURES 9 and 10 show another alternative embodiment of the present invention wherein the piezo-electric crystal is operated in a flexural mode rather than in the longitudinal mode shown in the previous figures. Here, the piezo-electric crystal is formed in the shape of a split ring or cylinder 39 whose curvature lies substantially in the X—Y plane as shown in FIGURE 11. A gap is cut in the wall of the ring and extends in the Z direction such that the ends of the ring defining the gap are free to move in order to vary the gap width on application of a proper field to the crystal. Within the fluid amplifier, the control stream conduit is formed with a circular chamber 40 situated intermediate the control stream nozzle 17 and a duct 41 which supplies fluid into chamber 40 from an outside source not shown in the figure. Duct 41 enters chamber 40 at an angle perpendicular to the plane of the paper of FIGURE 9. Within chamber 40 the split ring piezo-electric crystal 39 is placed so that its gap lies athwart the flow path taken by the fluid as it passes from duct 41 through chamber 40 to the outlet nozzle 17. A pair of studs or projections 42 and 43 extend inwardly of chamber 40 to which is welded or soldered split ring 39 at its nodal points.

The theory behind the flexural mode of operation of the split ring piezo-electric crystal is fully described in an article by J. E. Thwaites, "Quartz Vibrations for Audio Frequencies," appearing in Proceedings of the Institution of Electrical Engineers (British), volume 99, part IV, page 83–91 (April 1952). As there described, upon application of an electric field across the surface of the split ring crystal, the effective width of the gap may be made to vary by the flexing of the ring such as is shown by the dot-dash outline in FIGURE 9. In its unenergized state, the form of the ring is as shown by the solid outline. However, upon application of the proper electric field, the physical dimensions of the ring may vary so that it now takes the form indicated by the dot-dash outline, with the consequent increase in the width or area of its gap. By so increasing the gap width, more fluid is allowed to flow from within the ring through the gap and out via nozzle orifice 17 to the fluid interaction chamber of the fluid amplifier. The fluid within the ring is supplied by inlet duct 41. Therefore, the gap of the split ring may be considered as being part of the fluid conduit whose cross-sectional area may be varied in order to change the fluid flow through said conduit.

Figure 12:
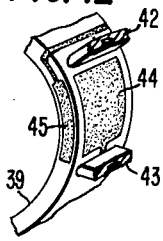

The above-identified article by Thwaites indicates several ways in which the proper electric field may be applied to the split ring in order to operate it in its flexural mode so as to vary the gap width. One of these ways is utilized in the present embodiment of the invention and comprises a set of electrodes plated upon the surfaces of the ring in a manner shown in FIGURE 12. An electrode 44 is plated between the nodal points of the ring and is electrically connected to a conductor 48 threaded through stud 43. On each ring surface lying in the XY plane is plated an electrode 45 or 46, each of which is further connected to the conductor 47 threading stud 42. When a potential is applied between these two conductors, electrode 44 is at a potential different from the potential of electrodes 45 and 46.

Figure 13:
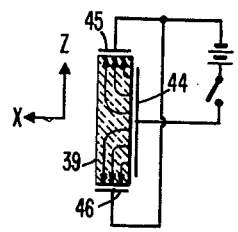

FIGURE 13 shows the cross-section of ring 39 taken at a point mid-way between studs 42 and 43, together, with the plated electrodes 44, 45 and 46. As seen from FIGURE 11, the thickness dimension of the ring wall in this center section is substantially parallel to the X electrical axis of the piezo-electric crystal. Thus, electrode 44 is plated on an X surface of the ring, while electrodes 45 and 46 are plated on Z surfaces. If electrode 44 is now made positive with respect to electrodes 45 and 46, an electric field is set up within the crystal, as shown by the arrows in the body of the crystal, from electrode 44 to electrodes 45 and 46. Only the right hand side of the crystal cross-section in FIGURE 13 has field components parallel to the X axis. Thus, within this right hand side, a mechanical stress occurs along the Y axis, which in turn has a direction perpendicular to the plane of the paper. If the polarity of the electric field within this right hand side is such as to cause compression of the material comprising this side, then the outer peripheral length of the ring between studs 42 and 43 will decrease. However, the left hand side of the cross-section in FIGURE 13 remains unstressed so that the inner periphery of the ring does not change in length to the same degree as the outer periphery. Therefore, there is a straightening of the ring portion between studs 42 and 43 as shown by the dot-dash lines in FIGURE 9, with the consequent effect of moving the ends of the ring away from one another so as to widen the gap. Upon terminating the electric field the ring resumes its original dimensions. Other electrode configurations may instead be utilized as described in the above-identified article.

Figure 14:
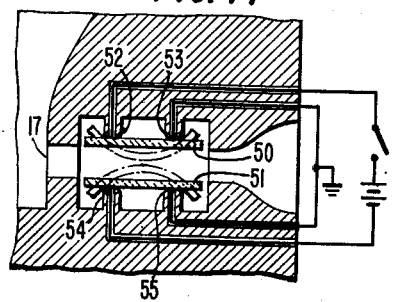
FIGURES 14 through 16 show a second flexural mode transducer embodiment.
Figure 15:
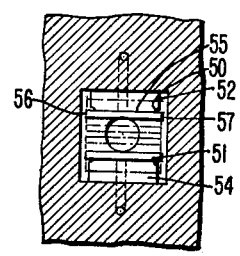
Figure 16:
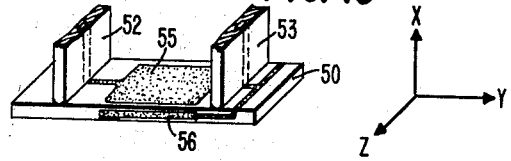

FIGURE 14 shows still another alternative embodiment of the invention wherein the flexural mode of operation is utilized to vary the cross-sectional area of the fluid control stream conduit. In this embodiment, two plates or bars 50 and 51 of piezo-electric material are positioned on opposite sides of the conduit so that, when flexed, the plates bend to extend into the conduit and thus restrict the flow path taken by the fluid on its way to control nozzle 17. Plate 50 is welded or soldered to two projecting studs 52 and 53 at its two nodal points, such that both ends of the plate and its center section are free to move in the manner indicated by the dot-dash outline in FIGURE 14. Plate 51 is likewise attached at its nodal points to projecting studs 54 and 55. On each plate are placed electrodes best shown in FIGURE 16. For example, electrode 55 is plated on the crystal between studs 52 and 53 of plate 50. This electrode 55 is connected to a conductor threading the channel in stud 52. In similar fashion, electrodes 56 and 57 are plated on the edges of the bar with each being connected to the conductor threading the channel in stud 53. Each crystal plate 50 and 51 is an X-cut plate in that its major area surfaces are perpendicular to the X axis of the original crystal from which it is taken. Thus, electrode 55 is plated on an X surface of the crystal plate 50, while electrodes 56 and 57 are plated on Z surfaces. The Y axis of crystal plate 50 therefore lies in the direction of length as shown in FIGURE 16.

In operation, the flexing of plates 50 and 51 to the position shown by the dot-dash outlines is similar to the flexing of the split ring in FIGURE 9. If a cross-section is taken of plate 50 at a point intermediate the two studs 52 and 53, this can be represented by FIGURE 13. When electrode 55 is placed at a potential different from electrodes 56 and 57, the non-uniform electric field within the crystal cross-section causes stress along the Y direction (length) of one major surface of the plate but no stress along the Y direction of the opposing major surface of the plate. If such stress is extensional, due to proper polarity of the potential, then the crystal bends as shown in FIGURE 14 and so extends into the conduit in order to vary its effective cross-sectional area.

Although the preceding embodiments of the invention have been illustrated as utilizing material exhibiting the piezoelectric effect, it is to be understood that the principles here expounded may be applied to other materials which exhibit a change in dimension due to an applied field. For example, the electrostriction phenomenon may be utilized to control fluid flow through the conduit in response to electrical signals. Electrostriction is an effect similar to the piezo-electric effect and is usually referred to by the latter term, although it could be called a "polarized electrostrictive effect." In general, when so-called polycrystalline electrostrictive (or ferroelectric) material is subjected to an electric field, its dimensions are modified. However, the relative change in the material is a function of the absolute value of the applied electric field so that polarity makes no difference. A polarizing D.C. field is often employed to establish an operating point in the ferroelectric material so that application of an A.C. current thereto causes compression and elongation of the material about its quiescent dimension. In this way, the polarized electrostrictive effect is quite similar to the piezo effect, since the change in dimension may occur in either direction. However, for many materials it is not necessary to apply a continuous D.C. polarizing field since there can be made to exist a remanent internal polarization which is stored within the internal structure by applying a strong D.C. field for a certain time. A permanently polarized electrostrictive transducer can be considered practically identical with a piezo-electric transducer from the point of view of operation. Some electrostrictive materials which may be utilized are barium titanate ceramics, and niobates.

Figure 17:
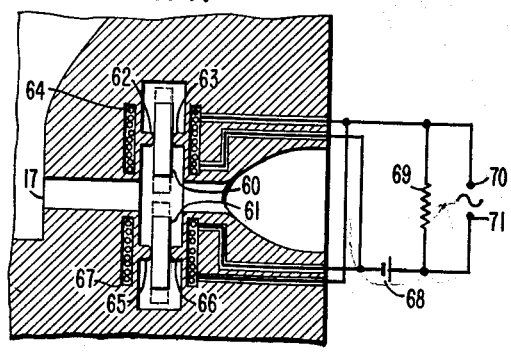
FIGURE 17 shows yet another embodiment of the present invention which utilizes ferro-magnetic material in a manner identical to FIGURE 2.

Other materials which exhibit a change in physical dimension upon application of a field thereto are the so-called ferro-magnetic materials which exhibit the property of magnetostriction. When a ferro-magnetic material is subjected to a magnetic field, its dimensions are changed in the direction of the field. The relative change in the ferro-magnetic material is a function of the absolute value of the applied magnetic field and thus is independent of the sign of the field. This effect is sometimes called the Joule effect. FIGURE 17 illustrates a transducer for converting electrical signals into change in fluid flow wherein is utilized ferro-magnetic material in a manner quite analogous to the use of piezo-electric material in FIGURE 2 previously described. Two ferro-magnetic plates 60 and 61 are positioned opposite the fluid flow conduit by means of studs welded or soldered to their nodal points. For example, plate 60 is supported by studs 62 and 63 within a recess on one side of the conduit leading to orifice nozzle 17 of a fluid amplifier. A coil 64 is wound about the recess such that a magnetic field can be set up within the recess in a direction calculated to cause an extension of plate 60 into the conduit, as illustrated by the dot-dash outline. Plate 61 is also supported by studs 65 and 66 and is further surrounded by a coil 67, which, when energized, causes an extension of plate 61 into the conduit in order to reduce the flow area thereof. Coils 64 and 67 are energized by conductors placed in grooves within the body of the fluid amplifier. If it is desired to linearly modulate the fluid flow to the conduit, a permanent D.C. bias battery 68 may produce a steady D.C. current through said coils via resistor 69 in order to establish an operating point about which the current in the coils fluctuates. A modulating A.C. voltage is applied between terminals 70 and 71 in order to vary the coil current about the operating point and thus vary the length of plates 60 and 61 so that linear modulation of the fluid flow occurs.

Other embodiments of transducers using ferro-magnetic material can be devised according to those in FIGURES 6 through 16. Therefore, while only certain exemplary embodiments have been shown and described, others may be apparent to those skilled in the art without departing from the spirit of the invention as defined in the appended claims.

I claim:
1. A transducer for converting a change of electrical potential into a change in fluid flow which comprises: a conduit adapted to receive a stream of fluid and to conduct same therethrough, a first pair of co-planar piezo-electric crystals mounted in said conduit and interposed radially on opposite sides of the fluid stream therein with a mechanical axis of each being transverse to the axis of fluid flow, a second pair of co-planar piezo-electric crystals mounted in said conduit and interposed radially on opposite sides of the fluid stream therein with a mechanical axis of each being transverse to the axis of fluid flow but at substantially a right angle to said mechanical axes of said first pair, and means to apply an electrical potential across each said crystal having a component parallel to an electrical axis thereof and of a polarity to cause a mechanical stress in and a change of dimension of said crystal along said mechanical axis in a direction to vary the fluid flow through said conduit.

2. A transducer according to claim 1 wherein said first and second pairs of crystals are in different planes each at a different axial point of said conduit.

3. A transducer according to claim 1 wherein said first and second pairs of crystals are in the same plane.

4. A device for converting an electrical signal into a change in fluid flow which comprises: a conduit adapted to receive a stream of fluid and to conduct same therethrough; a plurality of electro-mechanical transducers made of material whose physical size changes in at least one dimension in response to an applied field; means mounting each said transducer within said conduit in co-planar relationship with at least one other transducer such that said one dimension is transverse to the axis of fluid flow whereby a change therein changes the effective conduit cross-sectional fluid flow area; and means responsive to an electrical signal for simultaneously applying a field to each transducer whereby said flow area is changed.

5. A device according to claim 4 wherein said transducer material is piezo-electric in nature, and said last mentioned means applies an electric field.

6. A device according to claim 4 wherein said transducer material is ferro-magnetic in nature, and said last mentioned means applies a magnetic field.

7. A device for converting an electrical signal into a change in fluid flow which comprises: a conduit adapted to receive a stream of fluid and conduct same therethrough; first and second pairs of electro-mechanical transducers made of material whose physical size changes in at least one dimension in response to an applied field; first means mounting the transducers of said first pair on opposite sides of said conduit in co-planar relationship with each other such that said one dimension is transverse to the axis of fluid flow whereby a change therein changes the effective conduit cross-sectional fluid flow area; second means mounting the transducers of said second pair on opposite sides of said conduit in co-planar relationship with each other such that said one dimension is transverse to the axis of fluid flow but at substantially a right angle to said first pair one dimension whereby a change in said second pair one dimension also changes the effective conduit cross-sectional fluid flow area; and means responsive to an electrical signal for simultaneously applying a field to each said transducer whereby said flow area is changed.

8. A device according to claim 7 wherein said first and second pairs of transducers are mounted in different planes each at a different axial point of said conduit.

9. A device according to claim 7 wherein said first and second pairs of transducers are mounted in the same plane at the same axial point of said conduit.

10. The device according to claim 9 wherein each said transducer at its end nearest said other transducers is of a shape to provide a complementary fit with the ends of both transducers in the other pair.

11. The device according to claim 10 wherein said shaped ends of both transducers of said first pair are substantially triangular, and said shaped ends of both transducers of said second pair are substantially trapezoidal.

References Cited by the Examiner
UNITED STATES PATENTS

| 2,702,559 | 2/55 | Bodine | 251—129 |
| 2,887,294 | 5/59 | Hahn | 251—129 |
| 2,902,251 | 9/59 | Oncley | 251—129 |
| 3,055,631 | 9/62 | Kippenhan | 251—129 |

LEWIS J. LENNY, *Primary Examiner.*

EDWARD V. BENHAM, *Examiner.*